United States Patent [19]

Laurich-Trost

[11] Patent Number: 4,750,628
[45] Date of Patent: Jun. 14, 1988

[54] CONTROL SYSTEM FOR MULTI-PURPOSE UTILITY VEHICLE

[76] Inventor: Victor R. Laurich-Trost, 34600 McAfee Dr., Solon, Ohio 44139

[21] Appl. No.: 921,845

[22] Filed: Oct. 23, 1986

Related U.S. Application Data

[63] Continuation of Ser. No. 782,281, Sep. 3, 1985, abandoned, which is a continuation of Ser. No. 572,613, Jan. 23, 1984, abandoned.

[51] Int. Cl.⁴ .................. B62D 5/10; B66C 23/06
[52] U.S. Cl. .................. 212/232; 180/140; 180/236
[58] Field of Search ........... 180/140, 236, 149, 22, 180/79.1; 212/232, 189, 267, 255

[56] References Cited

U.S. PATENT DOCUMENTS

| | | | |
|---|---|---|---|
| 2,512,979 | 6/1950 | Strother | 180/149 X |
| 2,863,518 | 12/1958 | Pellizzetti | 180/140 |
| 3,064,745 | 11/1962 | Colt et al. | 180/236 |
| 3,197,229 | 7/1965 | Houlton | 180/140 |
| 3,255,840 | 6/1966 | Tangen | 180/140 X |
| 3,556,241 | 1/1971 | Mitchell | 180/140 |
| 3,648,850 | 3/1972 | Rochon | 212/267 |
| 3,903,979 | 9/1975 | Perrotin | 180/140 X |
| 3,972,379 | 8/1976 | Norris | 180/140 X |
| 3,990,714 | 11/1976 | Hornagold | 212/189 |

Primary Examiner—John A. Pekar
Attorney, Agent, or Firm—Watts, Hoffmann, Fisher & Heinke Co.

[57] ABSTRACT

Each pair of wheels is interconnected by a tie-rod assembly. The tie-rod assemblies include ring gears connected with each of the wheels, and drive motors including drive gears mesh with each ring gear whereby the tie-rod assemblies enable synchronous turning movement of the wheels when the drive motors are actuated.

8 Claims, 7 Drawing Sheets

CONTROL SYSTEM FOR MULTI-PURPOSE UTILITY VEHICLE

This is a continuation of Ser. No. 782,281 filed 9/3/85, now abandoned which is a continuation of application Ser. No. 572,613, filed 1/23/84, now abandoned.

DESCRIPTION

TECHNICAL FIELD

The present invention relates generally to a vehicle for material handling and more specifically relates to the control system for a multi-purpose vehicle which incorporates a telescopic boom and hydraulic platform lift functions in conjunction with a selectively adjustable outrigger assembly having a low center of gravity together with a multi-operational steering mode for a variety of industrial load-receiving operations.

BACKGROUND ART

The present invention relates to a control system for a multi-purpose utility vehicle of the type described in applicant's co-pending U.S. application Ser. No. 06/106,468 filed Dec. 26, 1979, now U.S. Pat. No. 4,363,409. In such application, there is disclosed a multi-purpose utility vehicle for handling various items and/or materials. The vehicle provides, on one chassis, an articulated vehicle which incorporates a pivotally mounted, telescopic boom assembly for continuous pivotal movement capable of rotation through an arc of 360°. The vehicle chassis also mounts a hydraulically operated lift platform assembly disposed at the forward end of the vehicle to provide a load receiving function in response, for example, to loading from the telescoping boom assembly. In addition, the vehicle incorporates a selectively adjustable outrigger assembly which may be extended and retracted laterally and longitudinally in respect to the vehicle chassis for stabilizing the vehicle and handling heavy loads. Accordingly, the description of applicant's co-pending application in respect to such multi-purpose functions is incorporated herein by reference so as to be included as a part hereof.

DISCLOSURE OF THE INVENTION

The present invention provides a new and novel control (i.e., steering system) which includes multiple modes of steering which can be accomplished from a control console indicated in the operator's cab. Specifically, and as disclosed in applicant's aforementioned co-pending application Ser. NO. 06/106,468 the modes of steering include a neutral wheel position, a front wheel steer position only, rear wheel steer position only, a front and rear wheel steering (front and rear in opposite directions) position, and a front and rear wheel steering for a 0°–90° turn (i.e., same direction). In the invention, the front and rear wheels are operably connected together to accomplish such multiple mode steering functions and the rear wheels may be provided with selectively actuatable lock mechanisms to enable, for example, the rear wheels to be locked in a neutral position when the front wheels are connected mechanically for automotive steering.

More specifically, in the invention the front and/or rear wheels are mechanically connected for independent or simultaneous turning movement upon turning movement of the operator's wheel to enable the vehicle to be steered in linear as well as angular directions. For example, by the mechanical interconnections between the front wheel pairs and the rear wheel pairs and/or between the wheel pairs themselves then is provided multiple steering modes which enables the vehicle to move linearlly forward and back and transversely, and which enables the vehicle to move angularly in a direction from 0°–90° in a "crabbing" mode of operation.

Additional features and a fuller understanding of the invention will be obtained in reading the following detailed description made in connection with the accompanying drawings.

BEST MODE FOR CARRYING OUT THE INVENTION

Figure 1:
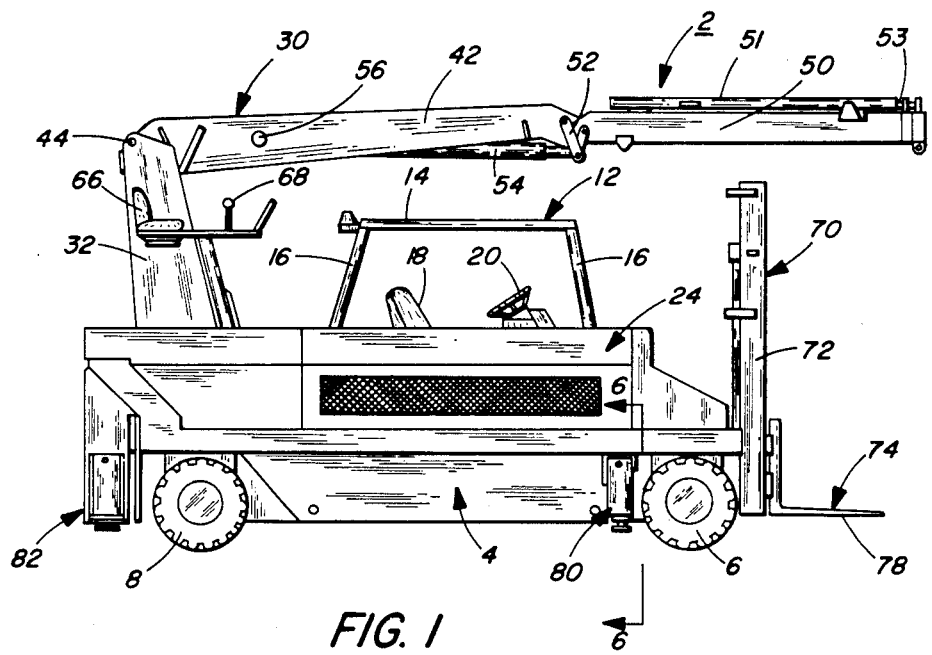
FIG. 1 is a side elevation view of the multipurpose utility vehicle in accordance with the present invention.

Referring again to the drawings and in particular to FIGS. 1–4 thereof, there is illustrated the multipurpose utility vehicle of the invention, designated generally at 2, which includes a chassis 4. As shown, the chassis is mounted for forward, rearward, sideways and pivotal turning movement in accordance with the control system of the invention by means of a pair of front wheels 6 and a pair of rear wheels 8 driven by hydraulic hub motors 7. The chassis includes a work platform 10 (FIG. 3) which extends substantially throughout the length of the chassis and provides a support for a framework 12 which functions to provide a protective cab surrounding the operator for the vehicle. The framework 12 is of a rigid assembly comprised of a roof 14 and a plurality (4) of inclined posts 16 rigidly connected to the floor or support surface 10 of the chassis. This framework provides a convenient operator cab which gives good visibility for the operator when in the seat 18. The cab includes a suitable steering wheel 20 and the control console for operating the steering system in accordance with the invention.

Figure 2:
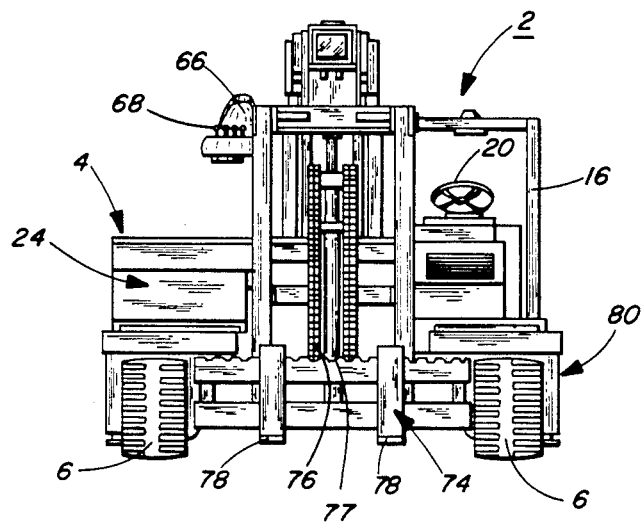
FIG. 2 is a front elevation view looking from the right-hand side of FIG. 1.
Figure 3:
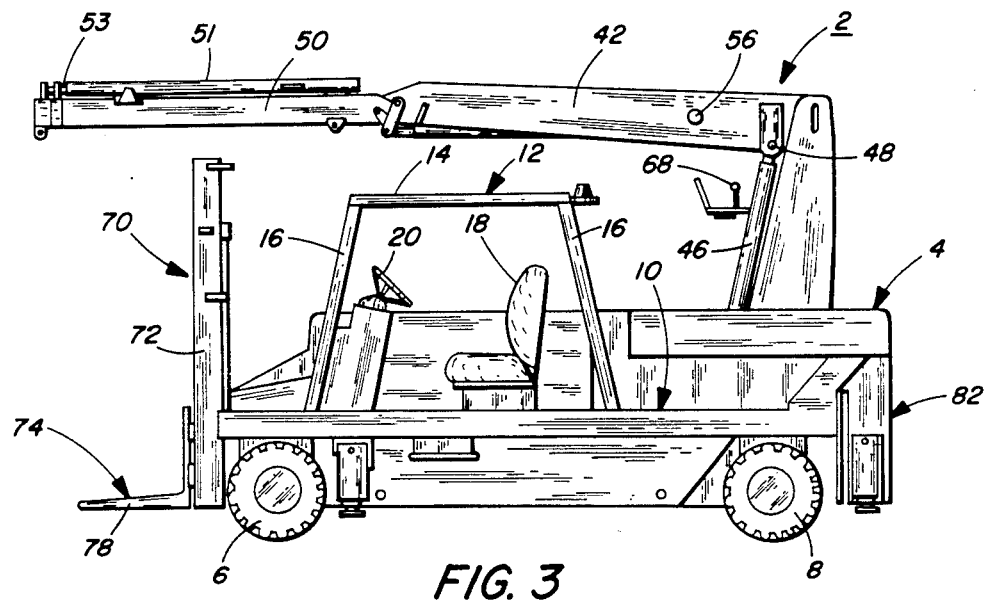
FIG. 3 is a side elevation view looking from the side opposite to that of FIG. 1.
Figure 4:
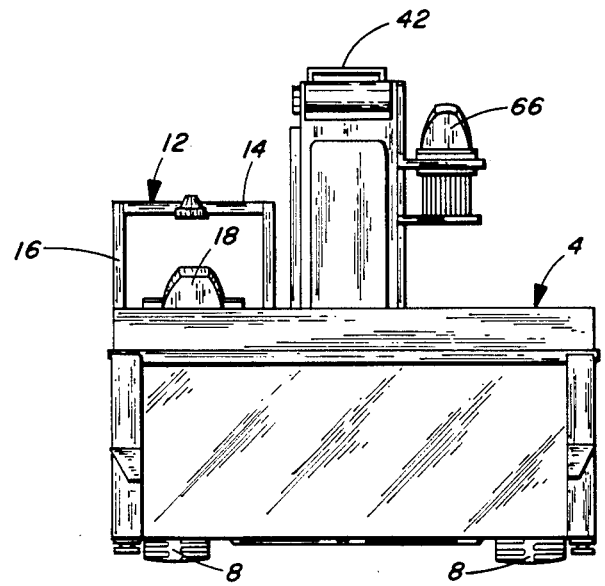
FIG. 4 is a rear view looking from the left side of FIG. 1.

As shown, it is preferred that the framework 12 defining the operator's cab be disposed laterally in off-set relation (FIG. 4) in respect to the longitudinal central axis of the vehicle chassis. By this arrangement, ready access is given to the operator on one side of the vehicle and also enables the boom assembly and operator therefor to be disposed on the other side of the vehicle for maximum operating efficiency and visibility. Accordingly, the motor drive unit for the vehicle, designated generally at 24, including that for the boom and lift platform assemblies is disposed on the opposite side of the vehicle chassis, as best seen in FIGS. 1, 2 and 3.

Generally, vehicle mounts a boom assembly, designated generally at 30, which is pivotally mounted for continuous movement through an arc of 360° about a vertical axis. As shown, the assembly 30 includes an upstanding base member 32 which is pivotally mounted on the floor of the chassis, as more fully described in applicant's co-pending application Ser. No. 06/106,468. The construction and arrangement of there components on the chassis provides a low profile design having a center of gravity located by the geometric center of the vehicle.

The base member 32 pivotally mounts an inner mast section 42 via a pivot pin 44. Pivotal movement of the member 42 about the pivot pin 44 is accomplished by a hydraulic cylinder 46 connected at one end to the chassis and pivotally connected at the other end, as at 48, to the member 42. An outer mast section 50 is pivotally mounted via a linkage, as at 52, to the inner mast section 42 and is pivotally actuated by another hydraulic cylinder 54 which may be pivotally connected, at as 56, to the inner mast section to allow pivotal movement of the outer mast section 50 via the pivotal linkage 52.

In the invention, the boom assembly may include the various optional accessory systems such as a winch, remote controls, scrape grapple, timber tongs, clamshell bucket, forks with a rotator, forks and clamps for pipe and poles, magnetics and the like. These implements may be controlled by suitable controls, as at 68, mounted on a seat platform 66 attached to the base member 32.

As best illustrated in FIGS. 1 and 2, the vehicle mounts at the forward end a lift-platform assembly, designated generally at 70, which is disposed generally centrally of the vehicle chassis. As shown, this assembly includes a framework 72 rigidly connected to the chassis. The assembly mounts a lift-platform 74 which may be actuated by chain drive 76 for raising and lowering the platform 74 which may comprise a pair of fork-arms 78. The chain drive 76 may be operably connected to a hydraulic cylinder 77 for raising and lowering, in a manner as known in the art. By this arrangement, the chassis is supported upon the wheels 6 and 8 with the boom assembly 30 disposed rearwardly of the chassis and lift platform 70 disposed forwardly on the chassis so as to provide an effective counter-balancing of the weight carried on the chassis.

In the invention, an outrigger support assembly is provided for stabilizing the vehicle during usage of the boom and/or lift platform assemblies. As shown, this assembly generally includes a front outrigger mechanism 80 and a rear outrigger mechanism 82 fixedly attached to the vehicle chassis. The front mechanism 80 is preferably disposed for extensive movement transversely of the chassis while the rear mechanism 82 is disposed for such transverse extensive movement and also for longitudinal extensible movement rearwardly in a direction away from the chassis. It will be understood, however, that the vehicle can be modified for certain applications wherein the rear mechanism may be employed at the front of the vehicle and viceversa, as desired. Further details as to the construction and operation of the outrigger support assembly may be had by reference to applicant's aforementioned co-pending United States application Ser. No. 06/106,468.

Now referring again to the drawings and in particular to FIGS. 5 through 9 thereof, there is illustrated one form of the steering system, designated generally at 18, which may be employed in accordance with the present invention. In general, the steering is accomplished through a main control panel or console 21 that may be conveniently located in the operator's cab 12. In the invention, the steering system includes four hydraulic orbital motors 10 operably associated with each of the vehicle wheels 6 and 8 for rotating the wheels about a horizontal axis upon turning movement of the steering wheel 20. The front and rear wheel assemblies, respectively, are operably connected for synchronous turning movement via a tie-rod assembly and the front and rear wheels, in turn, may all be operably connected together for synchronous turning movement via a longitudinal tie-rod transfer mechanism. The front and/or rear steering assembly may include a hydraulic booster mechanism which facilitates proper tracking of the wheels for 0°-90° rotation in a clockwise or counter-clockwise direction, as desired. One or both of the rear wheels may include a suitable lock mechanism for locking one or both wheels in any predetermined position.

Figure 5:
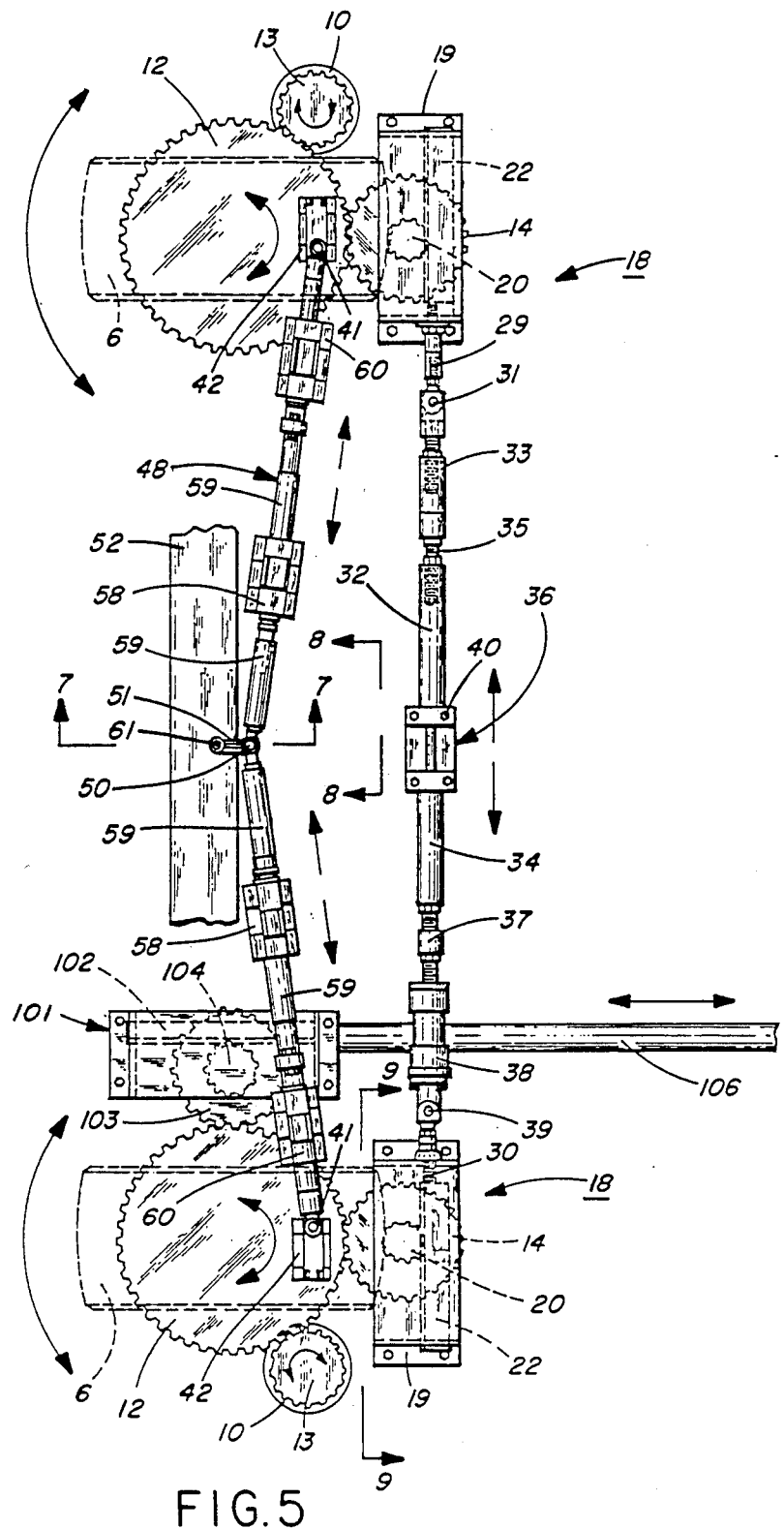
FIG. 5 is a fragmentary, top plan view looking downwardly at a portion of the front steering assembly.
Figure 8:
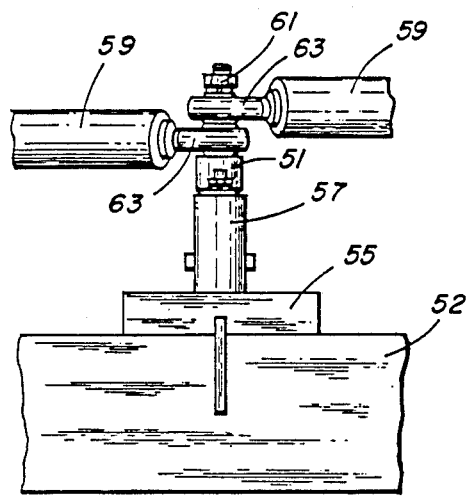
FIG. 8 is a fragmentary, enlarged section view taken along the line 8—8 of FIG. 5.
Figure 8C:
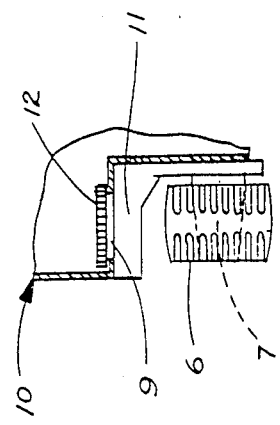
FIG. 8C is a fragmentary section view taken along the line 8C—8C of FIG. 1.

Now referring more specifically to FIGS. 5 and 8C thereof, the front steering sub-assembly is illustrated. Each wheel assembly includes a hydraulic hub type drive motor 7 which is mounted for pivotal movement about a vertical axis on a wheel housing member 11. The housing member 11 is mounted on the vehicle chassis (FIG. 8C) by a bearing plate 9 that, in turn, mounts a drive ring gear 12. The drive motor 7 is mounted in the hubs of the wheels 6 and 8 and are preferably of the type commercially available from the Rex-Roth Company of Germany under Model No. CHB-81574 RTX. Accordingly, the wheels 6 and 8 may be independently driven relative to one another and are pivotally mounted for steering about a horizontal axis by drive ring gears 12, as will be seen hereinafter.

As shown, the front wheels each include a hydraulic orbital motor 10 mounted on the chassis for turning the wheels 6 about a horizontal axis in clockwise and counterclockwise directions, as illustrated by the arrows. The orbital motors are preferably those made commercially available by the Char-Lynn Company under Model No. 103-1007-007, Series S. The motors 10 each mount an integral drive gear 13 which, in turn, meshes with the driven ring gear 12 mounted for pivotal rotation about a vertical axis above the wheel 6. The ring gear 12, in turn, meshes with a driven gear 14 (FIG. 9) fixedly mounted on a shaft 19 of a pinion gear 20 that is journalled at one end, as at 21, on the chassis frame 10 and at the other end, as at 28, in a casing 16. The pinion gear 20, in turn, meshes with a transversely extending rack member 22 that is journalled at its opposite ends, as at 15 and 17, in the casing 16. In the invention, the rack member 20 is operably connected to a primary tie-rod assembly, designated generally at 36, which provides for automatic synchronous turning movement of the wheels 6 upon actuation of the respective orbital motors 10.

In the embodiment illustrated, the primary tie-rod assembly 36 includes intermediate sections 32 and 34 which are operably connected by threaded couplings 33 and 37 to pivot links 31 and 39. The pivot liks 31 and 39, in turn, are fixedly attached for pivotal movement about a horizontal axis to the corresponding threaded ends of the rack members, as at 29 and 30, to enable the intermediate section of the tie-rod assembly to freely rotate about a horizontal axis to insure transfer of rotational movement between the wheels 6 for synchronous turning movement thereof. The tie-rod assembly includes a double-acting fluid cylinders 38 and 40 which act as boosters to facilitate 0°–90° turning rotation of the wheels. Accordingly, the booster cylinders 38 and 40 may be actuated ⅜" to ¾" to bring the wheels 6 into the full 90° position or back to the neutral position, as desired. This is, the assist in moving the wheels off a dead-center position.

Accordingly, in a typical operation with the wheels 6 disposed in the forward position, by operation of a suitable switch (not shown) located in the cab 12, the operator may turn the steering wheel 20 clockwise which automatically actuates orbital motors 10 which via drive gears 13 rotate the ring gears 12 in a counterclockwise directions. This movement, in turn, drives the rack 22 such that the wheels are automatically rotated synchronously 0°–90° so as to be disposed at right angles in the same direction relative to the longitudinal axis of the vehicle. Hence, the wheels can be manually (automotive) turned from 0° to 90° by turning of the steering wheel 20 (FIG. 1) so that the vehicle can be driven at an angle (i.e., 45°) in a "crabbing" manner by the self-propelled wheels via motors 7. Also, the wheels can be turned to a full 90° position in the same direction to enable the vehicle to move transversely and in either direction.

In the invention, the front wheels 6 may be further operably connected by a secondary tie-rod assembly 48 which is connected to the wheels and mounted, for example, on the bearing cylinder frame 52 of the forklift mechanism 70. As shown, this secondary tie-rod assembly 48 includes doubling actuating positioning cylinders 42 fixedly mounted on the ring gears 12 for rotation therewith. Cylinders 42 are pivotally connected, as at 41, to the piston ends of double acting hydraulic cylinders 60 that, in turn, are operably connected by links 59 to another pair of double acting hydraulic cylinders 58. The links 59 are pivotally connected, as at 63, to a bell crank arm 51 (FIG. 7) that is pivotally connected, as at 61, to the bearing cylinder 52. The bell arm 51 is connected to a support member 57 that is attached via a mounting block 55 carried by the bearing cylinder frame 52. Accordingly, by actuation of the cylinders 42, 58 and 60, the secondary tie-rod assembly 42 can be extended or retracted in opposite lengthwise directions, as illustrated by the arrows, to facilitate turning (i.e., tracking) movement of the wheels 6 about a horizontal axis. Accordingly, the cylinder pairs 42, 58 and 60 extend and retract to enable the tie-rod members 59 to automatically and rotatably track the rotation of the ring gears 12. Since the tie-rod members 59 are pivotally connected, as at 41, to the cylinders 42 which, in turn, are fixedly attached to the ring gears 12, the tie-rod members 59 can extend and retrack upon rotation of the drive gear 12 to enable one wheel (inner) to turn slightly inwardly ahead of the other wheel (outer) for manual (automotive) steering from 0° through 90°. In addition, it will be seen that upon actuation of the cylinders, the wheels 6 can be pre-positioned, such as at an angle of 20°, to facilitate turning movement of the wheels by minimizing the inertia forces in moving the wheels off a dead-center position. The cylinders 42, 58 and 60 may be pre-set for a 38" and ¾" stroke to enable the wheels to properly track when being turned from 0° through 90°. For example, this would insure that the inner wheel when turning clockwise would slightly lead or toe-in in relation to the outer or lead wheel to prevent dragging of the inner wheel.

In the invention, the rear steering assembly 70 (FIG. 6) is somewhat similar to the front steering assembly in that a third tie-rod assembly includes a rack mechanism that interconnects the rear wheels 8 for synchronous turning movement. As shown, this assembly 70 includes an elongated tie-rod 72 that is pivotally connected, as at 74, to a bell-crank arm 76 that, in turn, is coupled, as at 78, to the free end, at 80 of one rack member 22 that is driven by a pinion gear 20 upon actuation of the orbital motors 10 as aforesaid. The opposite end of the tie-rod member 72 is connected, as at 82, to another bell-crank arm 84 for securement to the other rack member 22. Accordingly by this arrangement this tie-rod assembly is also enabled to rotate about a horizontal axis via pivotal bell-crank connections 74 and 82 to effectively translate rotational movement back and forth between the wheels 8 upon actuation of orbital motors 10. Here again, booster cylinders (not shown) may be operably associated with the tie-rods to assist in moving the wheels off dead-center, as aforesaid.

In this embodiment, another booster secondary tie-rod assembly, designated generally at 90, may be provided for pre-positioning the rear wheels for the proper tracking rotation thereof. As shown, this secondary assembly includes a segment plate 92 (FIG. 8A) mounted for pivotal movement about a vertical axis on the vehicle chassis 10 by a bearing pin 91 ournalled on the chassis. The plate 92 mounts a pivot pin 94 that, in turn, pivotally connects pivot link arms 96 to integral tie-rod members 98. The opposite ends of the members 98 are provided with integral tie-rod ends 100 that, in turn, are pivotally attached to hydraulic cylinders 102 that can extend and retract for pre-positioning the wheels 8. The cylinders 102 are pivotally attached, as at 104, to double acting cylinders 103 which are fixedly attached to the ring gears 12 to enable the tie-rod assembly to rotatably track with rotational movement of the ring gears 12.

Figure 8B:
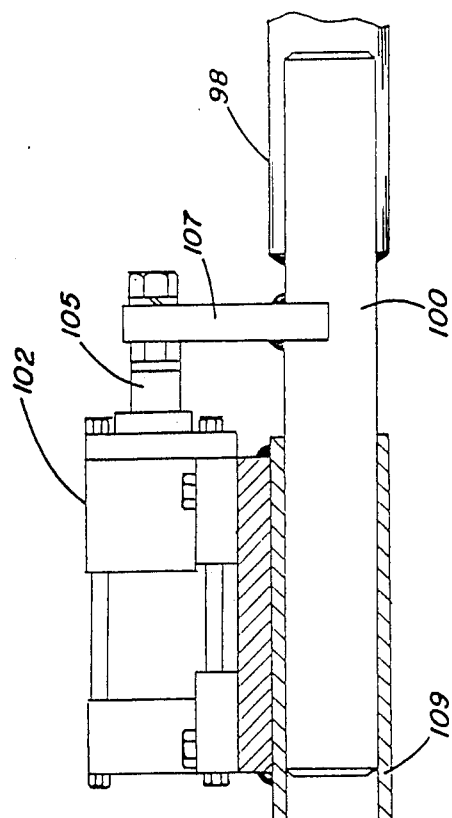
FIG. 8B is a fragmentary, enlarged section view taken along the line 8B—8B of FIG. 6.
Figure 8A:
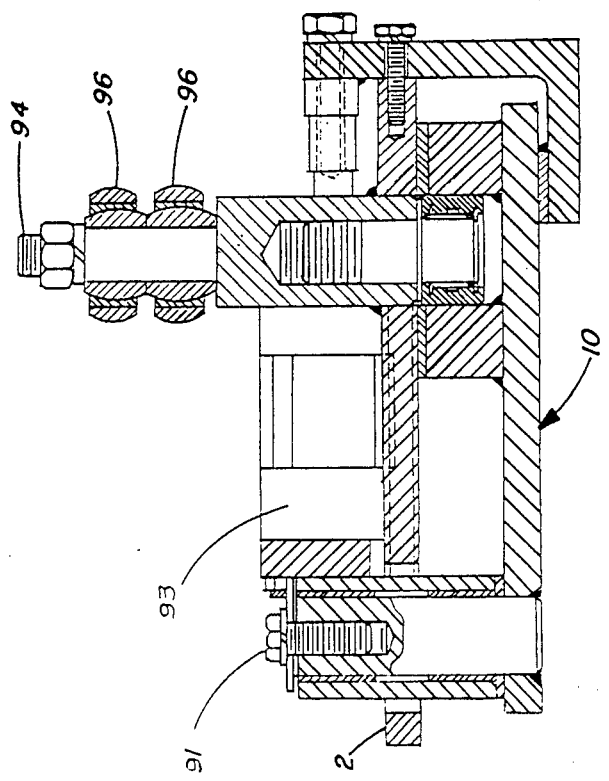
FIG. 8A is a fragmentary, enlarged section view taken along the line 8A—8A of FIG. 6, and rotated 180° in a clockwise directions.

As seen in FIG. 8B, the cylinders 102 are of the double-acting type and include pistons 105 that are fixedly connected by braket plates 107 to the tie-rod ends 100. The free ends of the tie-rod ends 100 are telescopically disposed in bearing sleeves 109. The sleeves 109 may be welded to support arms that are pivotally mounted, as at 104, to the hydralic cylinder 103 attached to the ring gears 12, as aforesaid. By this arrangement, upon actuation of the cylinders 102 and 103 the pistons 105 can extend or retract the tie-rod ends 100 and hence, the tie-rod members 98 to enable the one of the wheels 8 to be advanced slightly ahead of the other opposite wheel during manual (automotive) steering from 0° through 90°, as in the case of the front tie-rod booster assembly. As seen in FIG. 8A, the segment plate 92 pivots on pin 91 that is attached to the chassis. The plate mounts a pair of double acting hydraulic cylinders 93 that may be connected to the pin 94 to move the pin and hence, the links 96 in a horizontal direction. This again enables the tie-rod assembly to be extended or retracted to assist in assuring proper tracking of the wheels. In the invention, the front double-acting hydraulic cylinders 42, 58, and 60 may be of the same construction as the cylinders 103 and 103. Also, it will be understood that the front booster assembly 48 may be employed at the rear of the chassis in place of the assembly 90, as desired.

Figure 6:
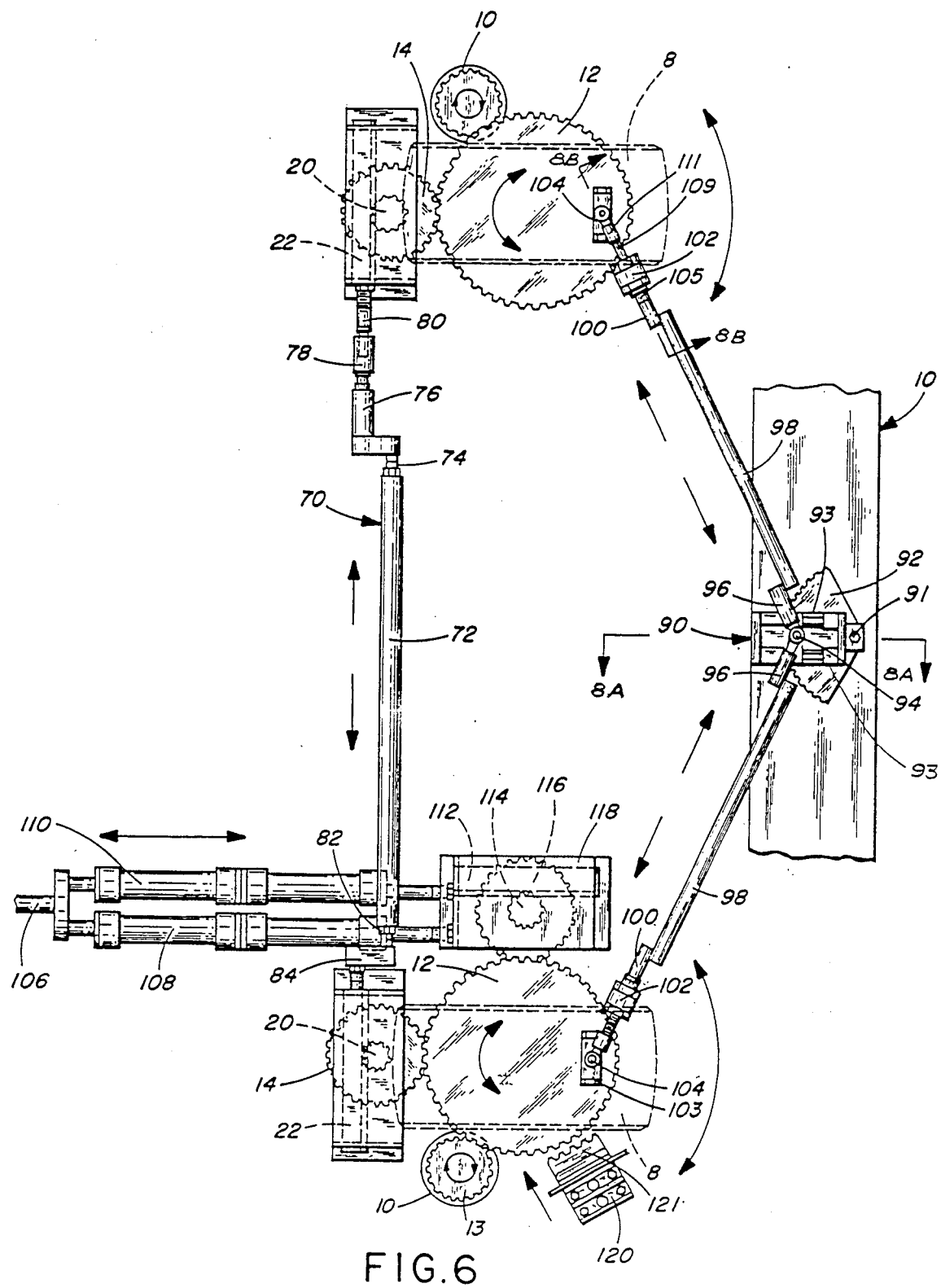
FIG. 6 is a fragmentary, top plan view looking down at a portion of the rear steering mechanism.
Figure 7:
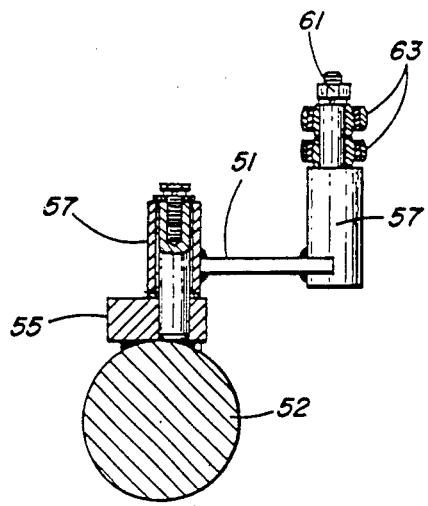
FIG. 7 is an enlarged section view taken along the line 6—6 of FIG. 5 with parts removed for purposes of clarity.
Figure 9:
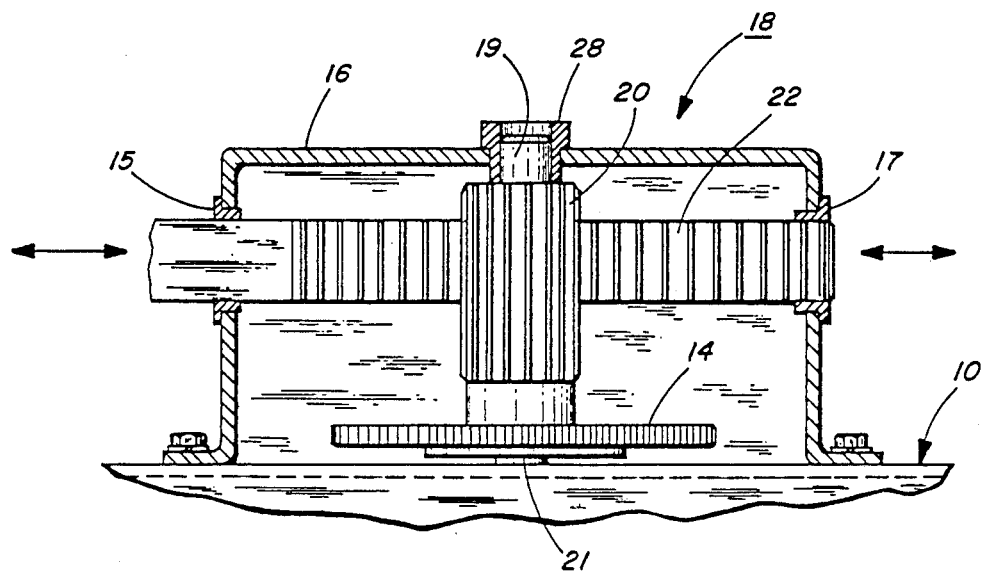
FIG. 9 is a fragmentary, enlarged section view taken along the line 9—9 of FIG. 5.

Now in the invention, the front 6 and rear 8 wheel pairs may be operably interconnected for rotational synchronous movement via a longitudinal rack transfer mechanism, designated generally at 101. As shown, this mechanism includes a front driven gear (FIG. 5) 103 that meshes with one of the ring gears 12. The drive gear 103, in turn, mounts a pinion gear 104 that drives a rack member 102 forwardly and backwardly, as illustrated by the arrow. The rack member 102 is operably connected to an elongated tie-rod member 106 that may be connected to a dual hydraulic cylinders 108 and 110. The cylinders 110 are connected to another rack member 112 that is driven by a pinion gear 114 in response to rotation of driven gear 116 that meshes with ring gear 12, as best illustrated in FIG. 6. Accordingly, by this arrangement the front and rear wheel pairs are operably interconnected for synchronous turning movement upon actuation of the hydraulic orbital motors 10 for all four wheels simultaneously.

In the invention, a lock mechanism, designated generally at 120, in the form of a toothed rack 121 may be associated with the rear (FIG. 6) and/or front wheels to lock same when the vehicle, for example, is driven a full 90° direction to either side, as desired. For example, these lock mechanisms may be located on the right front and left rear wheels so that the vehicle wheels can be locked in any position.

Figure 10:
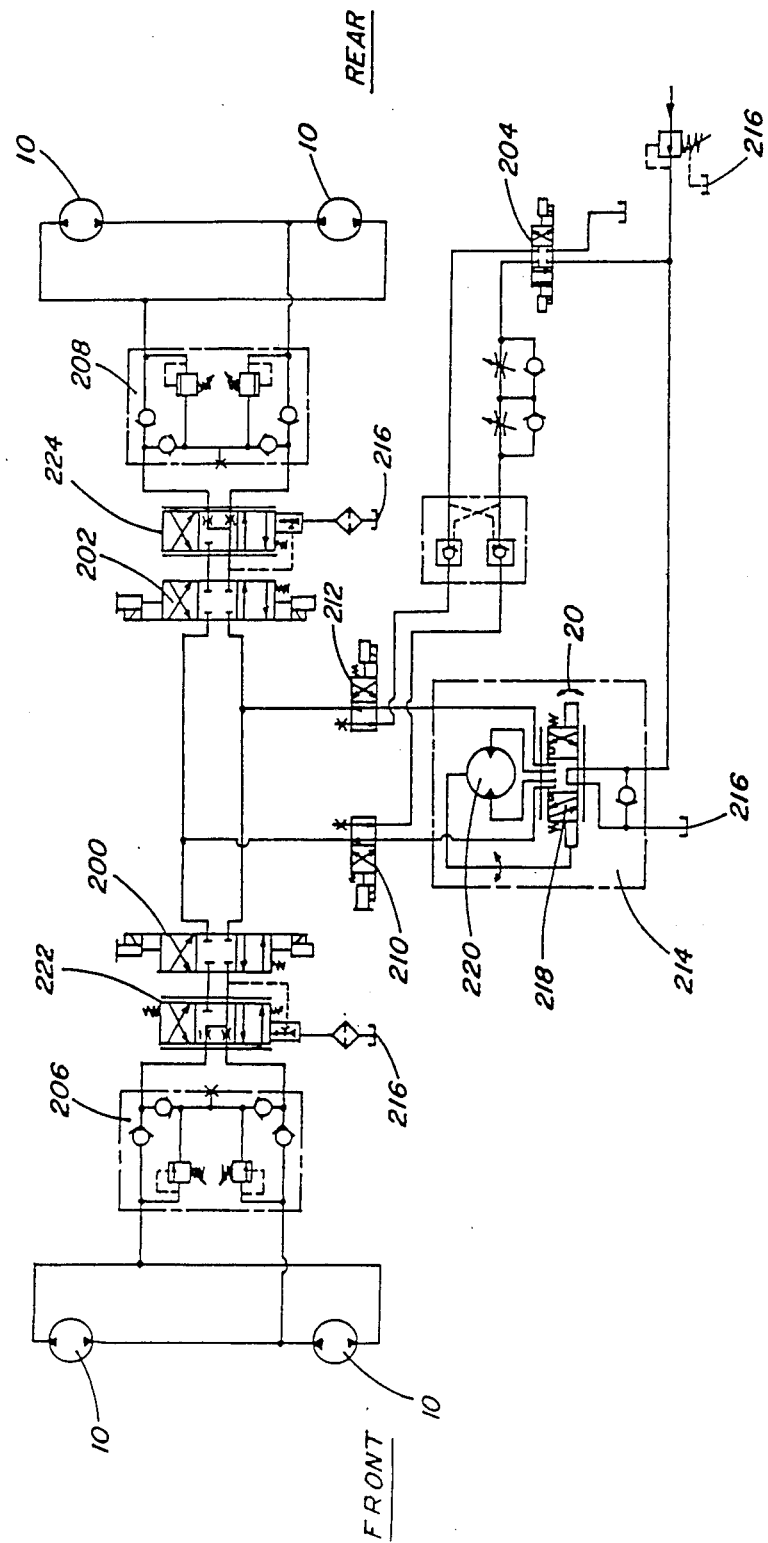
FIG. 10 is a schematic illustration which diagramatically illustrates one form of the hydraulic control system for use with the present invention.

Referring now to FIG. 10 of the drawings, there is generally illustrated a closed loop, hydraulic schematic diagram of the general type which may be be utilized in conjunction with the multiple steering modes of the present invention. In the invention, the working operations include basically five functions: neutral position, front wheel steering (only), rear wheel steering (only), front and rear wheels steer (front and rear in opposite directions), and front and rear wheel steer for a 90° turn (same directions), as will be seen hereinafter.

In the invention, the steering functions includes a neutral position. That is, when all four wheels 6 and 8 are in a straight forward position. A front wheel steer only condition. That is, where the two rear wheels 8 are locked in and the two front wheels 6 can turn in either direction from 0° through 90°. A rear wheel steer condition wherein- the front wheels 6 are locked and the rear wheels 8 can turn from 0° to 90° to either side of the longitudinal central axis of the vehicle. A front and rear wheel steer condition. That is, wherein the front and rear wheels steer in opposite directions to enable the vehicle to be turned through a radius of 360°. A front and rear wheel steer condition for 90° where all the wheels turn in the same direction. That is, the wheels can be turned to enable the vehicle to "crab" from 0° to 90°. For example, the vehicle can drive at a 45° angle.

Now in reference to the steering conditions and FIG. 10, the neutral position is where all wheels are in a straight forward position, as aforesaid. To start the operation, a steering mode selector switch (not shown) mounted on the operator's panel 21 in the cab 12 is a neutral position. In this neutral position, the directional (electric solenoid) control valves 200, 202, and 204 are not actuated. In this case, the motion control valves 206 and 208 lock the oribtal steering motors 10 to prevent driving rotation thereof and hence, maintaining all the wheels in a straight forward position.

In the front wheel steer only condition, the steering mode selector switch (not shown) is actuated for front wheel steering. Actuation of this switch actuates electrical directional solenoid control valves 210 and 212 which, in turn, allows the directional fluid (oil) flow from the power steering valve 214. The power steering valve 214, in turn, is actuated only by turning the steering wheel, as at 20 in the cab 12.

In this condition, the directional control valves 202 and 204 are not actuated and have blocked center to prevent the fluid flow to the tank 216 and to lock the rear wheels 8 in a neutral position. Manual steering (automotive) by turning of the steering wheel 20 now allows the front wheel orbital motors 10 to drive the front wheels simultaneously together in either direction from 0° through 90°.

In the rear wheel steering only condition, the steering mode selector switch (not shown) is actuated so to be in the rear wheel steer position. Actuation of this switch energizes electrical solenoid control valves 210 and 212 which allows oil flow from the power steering valve 214. The solenoid control valves 202 and 204 are not energized and have locked center to prevent fluid flow to the tank 216 so as to lock the front wheels in a neutral position. Manual turning of the steering wheel 20 now allows the rear orbital steering motors 10 to drive the rear wheels 8 in either direction from 0° through 90°.

The steering control valve unit 214 is a standard Char-Lynn power steering unit including a spool valve 218 and a main control valve 220 which is controlled by the spool valve 218, as known in the art.

In the front and rear wheel steer (automotive) condition, the steering mode selector switch (not shown) is actuated to the front and rear wheel steer position. Actuation of this switch energizes electrical solenoid control valves 210 and 212 which directs oil flow from the power steering unit 214. This allows oil to flow from the unit 214 simultaneously to all the orbital steering motors 10 simultaneously. This enables the front wheels 6 to turn simultaneously in one direction and the rear wheels to turn simultaneously in the opposite direction to enable the vehicle to turn in a radius about a vertical axis and through 360°. In this condition, the directional control valve 204 is not actuated and has blocked center to return fluid flow back to the tank 216. Manual steering by the steering wheel 20 now allows the front and rear wheel orbital drive motors 10 to steer in either direction, as aforesaid.

In the front and rear wheel steer for turning 90° in the same direction, the steering mode selector switch (not shown) is actuated to the front and rear wheel steer for 90° turn position. This energizes electrical solenoid control valves 210, 212 and 204 which then directs oil flow from the directional control valve 214. If value 204 is actuated to give a full 90° turn to the front and rear wheels in the same direction, this acts to bypass the manual steering mode via steering control valve 214. If electrical solenoid control valve 204 is not energized, the 90° turning is achieved by the manual (automotive) steering by steering wheel 20 and control steering valve 214. By this manual arrangement, the oprator is enabled to steer from 0° to 90° in a "crabbing" mode of operation in clockwise or counter clockwise directions, as desired. Accordingly, when electrical solenoid control valves 210, 212, 200 and 202 together with valve 204 are energized and electrical solenoid circuit valves 222 and 224 are energized, the front and rear wheels are automatically and simultaneously turned a full 90° in the same direction which bypasses the manual (automotive) steering via steering wheel 20. When electrical control solenoid valve 204 is not energized and in the neutral position, then the manual steering control valve 214 is not bypassed and the front and rear wheels can be turned from 0° through 90° for a "crabbing" mode of operation upon turning movement of the steering wheel 20 or to the full 90° direction, as desired.

Other and further objects and advantages of the invention will be apparent when taken in connection with the appended claims.

I claim:

1. A utility vehicle having a multi-steering capability comprising a chassis mounted for driving movement along the ground by a front pair of oppositely disposed wheels and a rear pair of oppositely disposed wheels, motor drive means operably connected to each of said wheels, said front pair of wheels being mechanically interconnected by a primary front tie-rod assembly and said rear wheels being mechanically interconnected by a primary rear tie-rod assembly, said primary front and rear tie-rod assemblies each include hydraulic cylinder means for automatically extending and retracting said tie-rod assemblies in lengthwise directions, said primary front and rear tie-rod assemblies includes a ring-gear member operably connected with each of said wheels for rotation in a generally horizontal plane about a vertical axis, and each of said drive motor means including drive gear means meshing with said ring-gear member for rotating said ring-gear member and the associated of said wheels in either direction upon actuation of said drive motor means, and said front and rear tie-rod assemblies being operably connected to the associated of said wheels to enable synchronous turning movement of said wheels upon actuation of said motor drive means for automatic turning movement of said wheels through an angle of 0° to 90° in either direction to enable forward, backward and lateral traversing movement of said vehicle.

2. A utility vehicle in accordance with claim 1, including an intermediate tie-rod assembly extending longitudinally of said vehicle chassis and operably connected to at least one of said front and rear wheels to enable automatic synchronous turning movement of said front and rear wheel pairs through an angle of 0° to 90° in either direction.

3. A utility vehicle in accordance with claim 1, including hydraulic booster cylinder means operably associated with at least said front wheels to facilitate rotary turning movement of said wheels from off a dead-center condition for 0° to 90° rotation in either direction.

4. A utility vehicle in accordance with claim 1, including brake means operably associated with at least one of said rear wheels for mechanically locking said rear wheels in a predetermined angular position.

5. A utility vehicle in accordance with claim 1, including brake means operably associated with said front and rear wheels for locking said wheels in a predetermined angular position during normal use thereof.

6. A utility vehicle in accordance with claim 1, including a telescoping boom assembly mounted on said chassis for pivotal movement through an angle of 360°.

7. A utility vehicle in accordance with claim 1, including an extensible and retractable outrigger assembly mounted on said chassis, said outrigger assembly including a front outrigger section adapted for lengthwise and transverse telescoping movement with hydraulic jack means operably connected to said outrigger section adapted for telescoping movement in a vertical direction for raising and lowering said chassis in relation to the ground.

8. A utility vehicle having a multi-steering capability comprising a chassis mounted for driving movement along the ground by a front pair of oppositely disposed wheels and a rear pair of oppositely disposed wheels, motor drive means operably connected to each of said wheels, said front pair of wheels being mechanically interconnected by a primary front tie-rod assembly and said rear wheels being mechanically interconnected by a primary rear tie-rod assembly, said primary front and rear tie-rod assemblies each include hydraulic cylinder means for automatically extending and retracting said tie-rod assemblies in lengthwise directions, said primary front and rear tie-rod assemblies includes a ring-gear member operably connected with each of said wheels for rotation in a generally horizontal plane about a vertical axis, and each of said drive motor means including drive gear means meshing with said ring-gear member for rotating said ring-gear member and the associated of said wheels in either direction upon actuation of said drive motor means, and said front and rear tie-rod assemblies being operably connected to the associated of said wheels to enable synchronous turning movement of said wheels upon actuation of said motor drive means for automatic turning movement of said wheels through an angle of 0° to 90° in either direction to enable forward, backward and lateral traversing movement of said vehicle including a hydraulically actuated double-acting fluid cylinder means operably connected between said front wheels for automatically moving said wheels from off a dead-center position upon rotary turning movement of said wheels in response to actuation of said motor means.

* * * * *